United States Patent [19]

Longstaff et al.

[11] 3,766,335

[45] Oct. 16, 1973

[54] TELEPHONE LINE VOLTAGE SENSING CIRCUIT

[75] Inventors: Fred McColl Longstaff, Islington; John Malcolm Petrie, Rexdale, both of Canada

[73] Assignee: ESE Limited, Rexdale Ontario, Canada

[22] Filed: Aug. 3, 1972

[21] Appl. No.: 277,579

[52] U.S. Cl. .............................. 179/175.3, 179/175

[51] Int. Cl. .............................. H04b 3/46

[58] Field of Search .......... 179/175.3, 175, 175.1 R; 324/76 R, 72.5; 320/1

[56] References Cited

UNITED STATES PATENTS 2,700,501 1/1955 Wang .............................. 324/76 R

*Primary Examiner*—Kathleen H. Claffy

*Assistant Examiner*—Douglas W. Olms

*Attorney*—Robert L. Westell et al.

[57] ABSTRACT

The voltage between telephone wires is used to produce and reverse voltage across a diode, each end of the diode is connected through a condenser to a voltage reference. One of the voltage references is replaced for a short period by a voltage which will cause conduction through a diode. The point at which conduction commences is a measure of the voltage on the telephone lines.

10 Claims, 3 Drawing Figures

PATENTED OCT 16 1973

3,766,335

SHEET 1 OF 2

TELEPHONE LINE VOLTAGE SENSING CIRCUIT

This invention relates to means and a method for sensing the voltage between a pair of telephone wires.

The invention provides means for providing the potential between the pair of telephone wires, or a voltage proportional thereto, across a rectifier which is poled against conduction under such voltage. At least one of the sides of the rectifier is connected to the wires through a resistance. Each side of the rectifier is connected through a condenser to a voltage reference, herein called voltage datum, the connection from the side of the rectifier corresponding to the above mentioned resistance, being effectively connected during a long interval and being effectively replaced during a short interval, by a third voltage datum whose polarity is such that after connection of the third voltage datum through a resistance to the condenser, the voltage on each side of the condenser is rapidly changed by the third voltage datum in a sense to cause conduction in the rectifier; after which conduction, current flow takes place at a slower rate determined by the time constant of the last-mentioned resistor and the two condensers connected in series. The result of this at the rectifier remote side of the second condenser is a sensing pulse having a high rise up to the point of conduction in the rectifier and a relatively flat rise thereafter, until the connection of the third voltage datum is terminated. The amplitude of the pulse at the time of conduction in the rectifier is of course a direct measure of the voltage between the telephone wires. For best results the time constant of the long interval, where the third terminal is disconnected, is long relative to the time constant of each of the two condensers and the resistance in their respective connection to the telephone wire, while the short interval where the third datum is connected is short relative to the time constant of the third datum resistance and the two condensers in series.

If the condensers are of equal value, and the resistance connecting them to the respective telephone wires, and the first and second voltage datums are of equal value, the effects of common mode voltage fluctuations in the telephone wires are avoided.

The voltage sensing device thus designed has the following advantages:

a. The input and output are DC isolated from each other by capacitors;

b. The preferred embodiment of the invention is substantially insensitive to common mode voltages;

c. The circuit allows convenient design for high input impedance resulting in negligible loading of the telephone line;

d. The noise injected into the telephone lines by the sampling circuitry is small, where resistors join condensers to the telephone line, particularly where the sample pulse is short;

e. The circuit is simple and inexpensive.

In drawings which illustrate a preferred embodiment of the invention:

Figure 1:
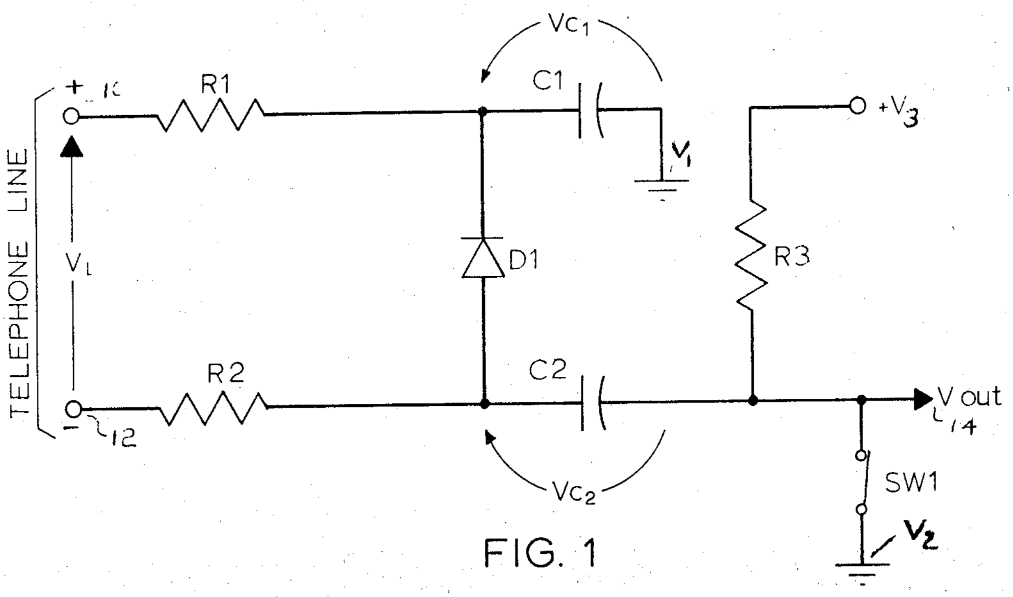
FIG. 1 shows one embodiment of the invention.

In the drawings, FIG. 1 shows a simple embodiment of the invention. In FIG. 1 terminals 10 and 12 are provided for connection to respective wires of a telephone wire pair and at the right hand side of the circuitry in the drawing is a voltage sensing terminal 14. Terminal 10 is connected through $R_1$ to one side of a rectifier, here embodied by diode D1. Terminal 12 is connected through $R_2$ to the other side of diode $D_1$. The diode $D_1$ is poled to prevent conduction, having regard to the voltage on the wires connected to terminals 10 and 12. Thus with the diode poled as shown, the terminal 10 will be connected to the more positive telephone wire and terminal 12 will be connected to the more negative. The negative pole of the diode $D_1$ is connected to one side of condenser $C_1$ whose other side is connected to a voltage datum $V_1$ (here ground). The positive pole of the diode is connected to one side of a condenser $C_2$. The other side of condenser $C_2$ is connected to a voltage datum $V_2$ (here ground) through a switch $SW_1$. The switch $SW_1$, within the scope of the invention may be mechanical and/or manual, but within the timing for operation required by the preferred embodiment of the invention, it is preferred to use a transistor switch wherein the path shown is the emitter-collector path of the transistor which is switched to the conducting state by a gating signal by control connections not shown, for the period of the conduction period required.

The diode-remote side of the condenser $C_2$ is also connected to the sensing output terminal 14, and also connected through resistance $R_3$ to a third voltage $V_3$. $V_3$ differs from $V_2$ in a larger absolute amount than the maximum voltage created across $D_1$ with $SW_1$ closed and the potential difference $V_3 - V_2$ is of a sense to cause conduction in diode $D_1$ at a certain value of the rising voltage occuring after $SW_1$ is opened. Thus, in the form of the circuitry shown in FIG. 1, $V_3$ must be more positive than $V_2$ by an amount slightly greater than the voltage at terminal 10, less the voltage at terminal 12, plus the small voltage drop across $D_1$ in the conducting direction.

Figure 3:
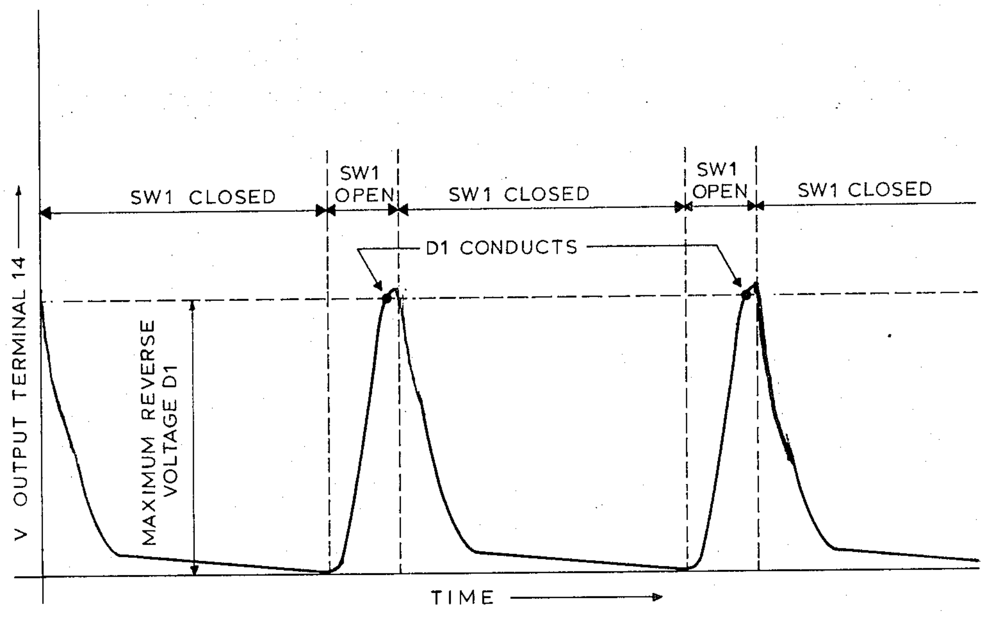
FIG. 3 shows a schematic graph of the output pulse.

In operation, with the terminals connected to the telephone wires, when $SW_1$ is closed, the diode-remote side of condenser $C_2$ is at ground potential $V_2$, and $SW_1$ is maintained closed for a period long relative to the time constant of $R_1$ and $C_1$ and relative to the time constant of $R_2$ and $C_2$, so that the voltage across $D_1$ is substantially the telephone line voltage. The switch $SW_1$ is then opened for a period short relative to the time constant of $R_3$, $C_1$ and $C_2$ in series. When $SW_1$ is opened (see FIG. 3) the output voltage, at terminal 14, will rise rapidly, until the consequent rise of voltage on the diode-adjacent side of $C_2$, causes conduction in diode $D_1$. With conduction through $D_1$, the voltage $V_{out}$ at terminal 14 will rise more slowly as $C_1$ and $C_2$ in series, are charged due to current flow through $R_3$, until $SW_1$ is again closed, the output voltage then falling approximately as indicated in FIG. 3. (The representation portrayed by FIG. 3 is schematic only and not intended to be in exact proportion, and in particular, the actual period in which $SW_1$ will be open under preferred operation will be one ten-thousandths of the time $SW_1$ is closed instead of the much larger proportion shown.) Returning to the operation, if the sample pulse duration is short compared to the time constant of $R_3$ and $C_1$ and $C_2$, in series, the output pulse will be essentially a flat topped pulse with amplitude varying with and nearly equal to $V_1$. The pulse amplitude at output 14 may be detected and measured by many alternative types of well known equipment connected to terminal 14.

Preferably the values $R_1=R_2$ and $C_1=C_2$. If the time constants $R_1$, $C_1$ and $R_2$, $C_2$ are equal, the circuit is insensitive to common mode transient voltage.

As previously stated, the length of the sample pulse should be short compared to time constant of $R_3$ and $C_1$ and $C_2$ in series, while the interval between sample pulses should be long relative to the time constants $R_1$, $C_1$ and the time constants $R_2$, $C_2$. If sampling is performed at a uniform rate, small deviation from the two interval criteria will merely result in a small DC offset in the size of the output pulse.

The forward voltage drop across the diode $D_1$ during conduction is relatively small and results in a small DC offset in the size of the output pulse.

The circuit as it stands, has a disadvantage that a large third voltage $V_3$ is required since $(V_3-V_2)$ must be greater than the maximum reverse voltage across $D_1$.

Figure 2:
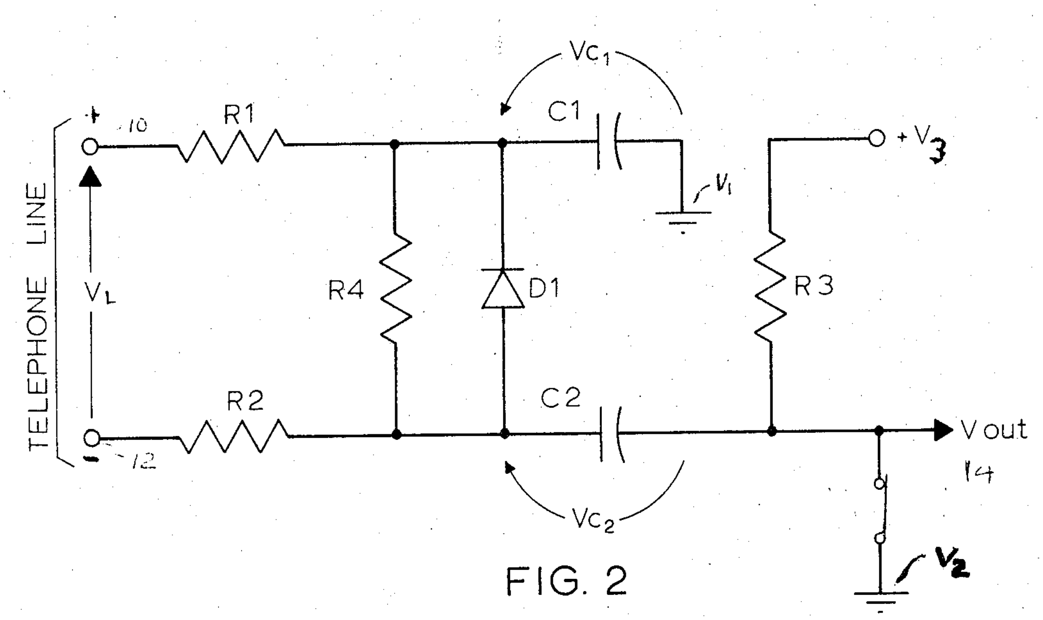
FIG. 2 shows an alternative embodiment.

FIG. 2 shows a modified form of the circuit in FIG. 1, wherein the resistance $R_4$ has been added in parallel with $D_1$. The voltage across $D_1$ now becomes $R_4/R_1 + R_4 + R_2 \times$ voltage across the the telephone lines, and the size of $V_3$ for $V_3-V_2> R_4/R_1 + R_4 + R_2$ is accordingly reduced.

Although leakage can take place from the telephone lines across the resistance $R_4$, this will be small at the proposed resistance values. (preferred values are listed hereafter).

The input time constant for differential voltages is now: $[(R_1 + R_2)\ R_4\ C_1\ C_2/\ (R_1 + R_2 + R_4)\ (C_1 + C_2)\ ]$. As is well known, the time constant associated with common mode voltage differs from this. However if $R_1=R_2$ and $C_1=C_2$; or if insensitivity to common mode voltages is not important, no problem is foreseen from the different common mode time constant.

$V_3 - V_2$ may now be reduced to a voltage just in excess of the maximum value of $(R_4/R_1 + R_4 + R_2)\ V_L$ The operation of the circuit of FIG. 2 is the same as the circuit of FIG. 1 and the graphs of FIG. 3 applies substantially equally thereto. As implied, on initiation of the sampling pulse, with the circuit of FIG. 2, conduction in $D_1$ commences and the pulse height is effectively set, when the voltage rise at $V_{out}$ is $(V_L R_4/\ R_1 + R_4 + R_2)$ and thus the $V_{out}$ pulse height gives an accurate measure of the line voltage $V_L$.

Without any sense intending to limit the scope of this patent, whose scope is to be gathered from the appended claims, the preferred values for the circuitry of FIG. 2 [(assuming $V_L$ (on hook) ] is designed for 48 volts and $V_L$ (off hook) is designed for 12 volts) is as follows:

| | |
|---|---|
| $V_1$, $V_2$ | ground potential |
| $V_3$ | 5 volts |
| $R_1=R_2=1.5$ | Megohms |
| $R_4=270{,}000$ | ohms |
| $C_1=C_2=15$ | nanofarads |
| $D_1$=1N914 | diode |
| $R_3=6000$ | ohms |
| $SW_1$ | is a transistor switch |

With such values and components, the input time constant $[(R_1+R_2)\ R_4\ C_1\ C_2/\ (R_1+R_2+R_4)\ (C_1+C_2)\ ]$ is 1.86 milliseconds.

The suggested sample pulse duration is 1 microsecond while the suggested interval between pulses is 10 milliseconds.

The circuit of FIG. 2, with the values as above set out, produced an output pulse of 4.9 volts with $V_L = 48$ volts and an output pulse of 1.9 volts with $V_L = 12$ volts, and the range of values of $V_{out}$ for various values of $V_L$ was found to be easily calibratable so that the voltage at $V_{out}$ gave a good indication of $V_L$.

The circuit of FIGS. 1 and 2, as generally described, includes the following advantages:

a. DC isolation of input from output by capacitors;

b. High input impedance, resulting in very small loading of the telephone line;

c. the circuit is simple and inexpensive.

Where the preferred form of the invention is used with $C_1=C_2$; $R_1=R_2$, $V_1=V_2$, the circuitry has the further advantages:

d. It is insensitive to common mode voltages;

e. Noise injected into the telephone line is small due to the presence of resistors $R_1$ and $R_2$ and the short duration of the sample pulse.

The circuit is subject to variations which include the fact that voltage datums $V_1$ and $V_2$ may be any value within the performance limits of the condensers $C_1$ and $C_2$. $V_1$ and $V_2$ may be different although will render the circuit sensitive to common mode voltages and the telephone lines subject to noise created in the circuit. $R_1$ may not only be different from $R_2$ but may be eliminated, although this will also render the circuit sensitive to common mode voltages and the telephone lines subject to noise created in the circuit. Also the elimination of $R_1$ causes the input impedance of the circuit to be reduced. $V_3$ may have any value as long as $V_3-V_2$ is large enough and in the correct sense to cause conduction through $D_1$ after $SW_1$ is opened.

I claim:

1. Voltage sensing circuit for determining the voltage between a pair of wires, including a pair of terminals, each arranged to be connected to a respective wire of such pair, a rectifier, a connection from one side of the rectifier to one of said terminals, a resistance connecting the other side of the rectifier to the other of said terminals, a first condenser connected on one side, to one side of said rectifier and on the other side to a first voltage reference $V_1$, a second condenser connected on one side to the other side of said rectifier and on the other side being connectible along a first connection to a second voltage reference $V_2$; a third voltage reference $V_3$ connectible along a second connection through a resistance to the said other side of said second condenser; means for alternatively causing the resistance along said first connection to be higher relative to the resistance along said second connection and vice versa, said third voltage reference being selected to be of a polarity that the difference $V_3 - V_2$ is of a polarity to tend to cause conduction through said rectifier during the period the resistance along said first connection is high relative to the resistance along such second connection.

2. Voltage sensing circuit as claimed in claim 1 wherein said means for alternatively causing relative resistance values is designed and constructed so that said resistance along said first connection is lower than the resistance along said second connection for a longer period than the reverse.

3. Voltage sensing circuit as claimed in claim 1 wherein a resistance connects said one side of said rectifier and said one of said terminals.

4. Voltage sensing circuit as claimed in claim 2 wherein a resistance connects said one side of said rectifier and said one of said terminals.

5. Voltage sensing circuit as claimed in claim 1 wherein said first connection is switchable between a very low resistance and a substantially infinite resistance and said second connection resistance is substantially greater than said first connection very low resistance, and said alternative causing means, comprises means for switching said first connection between very low and substantially infinite resistance values.

6. A device as claimed in claim 3 where a third resistance is provided, connected in parallel with said rectifier, wherein said parallel connected resistance is smaller than either of the resistances connecting said rectifier to a terminal.

7. A device as claimed in claim 1 wherein said means for alternatively causing is designed and arranged so that the interval during which said second connection is of relatively lower resistance, is short relative to the time constant of the resistance on said second connection and the two condensers in series.

8. A device as claimed in claim 6 wherein said means for alternatively causing is designed and arranged so that the interval during which said second connection is of relatively lower resistance, is short relative to the time constant of the resistance on said second connection and the two condensers in series.

9. A device as claimed in claim 3 wherein said means for alternatively causing is designed and arranged so that the interval during which said second connection is of relatively higher resistance, is long relative to each time constant of a resistance and the condenser connected to the same side of said rectifier.

10. A device as claimed in claim 6 wherein said means for alternatively causing is designed and arranged so that the interval during which said second connection is of relatively higher resistance, is long relative to each time constant of a resistance and the condenser connected to the same side of said rectifier.

* * * * *